(12) United States Patent
Yuan et al.

(10) Patent No.: US 11,552,326 B2
(45) Date of Patent: Jan. 10, 2023

(54) BUTTON LITHIUM ION BATTERY, PREPARATION METHOD THEREOF AND PREPARATION METHOD OF LITHIUM ION CELL COMPOSITE FLAT SHEET

(71) Applicants: BetterPower Battery Co., Ltd., Guangdong (CN); Jiangxi BetterPower New Energy Co., Ltd., Jiangxi (CN)

(72) Inventors: Huijun Yuan, Guangdong (CN); Guomin Zhang, Guangdong (CN); Xiang Long, Guangdong (CN); Haitao Dang, Guangdong (CN); Aijun Jian, Guangdong (CN); Xiaolin Wang, Guangdong (CN); Yin Zhang, Guangdong (CN)

(73) Assignees: BetterPower Battery Co., Ltd., Shenzhen (CN); Jiangxi BetterPower New Energy Co., Ltd., Yichun (CN)

( * ) Notice: Subject to any disclaimer, the term of this patent is extended or adjusted under 35 U.S.C. 154(b) by 215 days.

(21) Appl. No.: 16/914,454

(22) Filed: Jun. 28, 2020

(65) Prior Publication Data

US 2021/0265651 A1 Aug. 26, 2021

(30) Foreign Application Priority Data

Feb. 25, 2020 (CN) .......................... 202020210729.2
Feb. 25, 2020 (CN) .......................... 202020210845.4

(Continued)

(51) Int. Cl.
*H01M 50/109* (2021.01)
*H01M 10/04* (2006.01)
(Continued)

(52) U.S. Cl.
CPC ..... *H01M 10/0427* (2013.01); *H01M 10/0525* (2013.01); *H01M 10/0587* (2013.01); *H01M 50/109* (2021.01); *H01M 2220/30* (2013.01)

(58) Field of Classification Search
CPC .. H01M 50/32; H01M 50/531; H01M 50/572; H01M 10/04
See application file for complete search history.

(56) References Cited

U.S. PATENT DOCUMENTS 3,108,908 A * 10/1963 Krebs ................... H01M 10/34
429/162
2008/0038588 A1* 2/2008 Lee .......................... H01M 6/30
429/72

(Continued)

*Primary Examiner* — Kenneth J Douyette

(57) ABSTRACT

The invention relates to a button lithium ion battery, a preparation method thereof, and a method of producing a lithium ion cell composite flat sheet, wherein the button lithium ion battery comprises a battery housing, a cell accommodated in the battery housing and an electrolyte filled in the battery housing; the cell is formed by winding a composite flat sheet in which a first separator, a positive piece, a second separator and a negative piece are sequentially stacked and hot-laminated to form an integrated structure. The cell of the button lithium ion battery is formed by winding a composite flat sheet, so that winding efficiency can be improved, and misalignment can be avoided; moreover, chances of hand contact can be reduced, the influence of dust and water vapor can be avoided, and the quality of the lithium battery can be improved to the maximum extent.

17 Claims, 8 Drawing Sheets

(30) Foreign Application Priority Data

| | | |
|---|---|---|
| Mar. 11, 2020 | (CN) | 202010166394.3 |
| Mar. 11, 2020 | (CN) | 202010166396.2 |
| Mar. 11, 2020 | (CN) | 202010166418.5 |
| Mar. 11, 2020 | (CN) | 202010166976.1 |
| Mar. 11, 2020 | (CN) | 202010166998.8 |
| Mar. 11, 2020 | (CN) | 202010167044.9 |

(51) Int. Cl.
*H01M 10/0587* (2010.01)
*H01M 50/10* (2021.01)
*H01M 10/0525* (2010.01)

(56) References Cited

U.S. PATENT DOCUMENTS

| | | | | |
|---|---|---|---|---|
| 2008/0318124 | A1* | 12/2008 | Horiuchi | H01M 4/13 |
| | | | | 429/199 |
| 2015/0104711 | A1* | 4/2015 | Waki | H01M 4/625 |
| | | | | 252/182.1 |
| 2017/0025703 | A1* | 1/2017 | Pytlik | H01M 10/345 |

\* cited by examiner

BUTTON LITHIUM ION BATTERY, PREPARATION METHOD THEREOF AND PREPARATION METHOD OF LITHIUM ION CELL COMPOSITE FLAT SHEET

CROSS REFERENCE TO RELATED APPLICATIONS

The present application claims the benefit of Chinese Patent Application Nos. 202020210845.4 and 202020210729.2 filed on Feb. 25, 2020, and 202010167044.9, 202010166394.3, 202010166998.8, 202010166418.5, 202010166396.2, 202010166976.1 filed on Mar. 11, 2020. All the above are hereby incorporated by reference in their entirety.

TECHNICAL FIELD

The invention relates to the field of batteries, in particular to a button lithium ion battery, a method of producing button lithium ion battery and a method of producing a lithium ion cell composite flat sheet.

BACKGROUND ART

The steel housing button lithium ion battery has widespread use. The popularization of the wireless Bluetooth headset has witnessed a rapid increase of the steel housing button lithium ion battery which is now on hot sales. However, typically in the conventional method of preparing lithium batteries, a lug is welded to a foil-free area of a pole piece, an insulator tape is pasted and cut into sections of pieces required by the winding process. In the conventional lithium battery preparation, the pole pieces and the separators manufactured by a piece-making machine are usually required to be placed on a winding device, and then the positive piece, the negative piece and the separators are wound together. Misalignment is likely to occur since the positive piece, the negative piece and two layers of the separators are wound together and may cause quality issues; moreover, chances of hand contact are increased, dust, water vapor and the like are easily caused to influence the quality of the lithium battery; furthermore, a low winding efficiency leads to increased labor costs. In the relevant art, a cylindrical cell is formed in a lamination mode, which is vulnerable to risks such as low-voltage short circuit caused by piece burrs and the like; moreover, unpredictable risks are likely to occur due to misalignment, and this lamination mode features a low production efficiency.

SUMMARY OF THE INVENTION

It's an object of the invention to provide an improved button lithium ion battery, a method of producing a lithium ion cell composite flat sheet, and a preparation method of the button lithium ion battery.

The technical solution adopted by the invention for achieving the object is to construct a button lithium ion battery, comprising a battery housing, a cell accommodated in the battery housing, and an electrolyte filled in the battery housing, wherein;
the cell is formed by winding a composite flat sheet in which a first separator, a positive piece, a second separator and a negative piece are sequentially stacked and hot-laminated to form an integrated structure.

Preferably, one side of the first separator is coated with a hot-melt material; the side of the first separator coated with the hot-melt material faces the positive piece;
two sides of the second separator are coated with the hot-melt material connected with the positive piece and the negative piece.

Preferably, the hot-melt material comprises polyvinylidene fluoride hexafluoropropylene.

Preferably, a width of the composite flat sheet is 2 mm~350 mm;
the hot-lamination is conducted at a temperature of 45~85° C.;
and/or a pressure imposed on the composite flat sheet when conducting the hot-lamination is 1 T~2 T.

Preferably, the positive piece comprises a positive substrate and a positive material coated on the positive substrate;
and/or the negative piece comprises a negative substrate and a negative material coated on the negative piece.

Preferably, two ends of the cell are respectively provided with a positive lug and a negative lug; the positive lug is disposed on the positive piece; the negative lug is disposed on the negative piece.

Preferably, the battery housing comprises a housing top and a housing cup matched with the housing top;
the housing top comprises a first cover body and a first opening provided at one end of the first cover body; one end, distal to the first opening, of the first cover body is configured to correspond to a negative electrode of the button lithium ion battery;
the housing cup comprises a second cover body fitted around the first cover body and a second opening provided at one end of the first cover body; one end, distal to the second opening, of the second cover body is configured to correspond to a positive electrode of the button lithium ion battery;
the battery housing further comprises an explosion-proof structure which is formed by stretch molding on an outer end face of the end, distal to the first opening, of the first cover body, and/or on an outer end face of the end, distal to the second opening, of the second cover body.

Preferably, the explosion-proof structure is an explosion-proof stamp which is formed by stretch molding on the outer end face of the end, distal to the first opening, of the first cover body, and/or on the outer end face of the end, distal to the second opening, of the second cover body.

Preferably, the explosion-proof stamp has a width of 0.1~0.2 mm;
the explosion-proof stamp has a depth of 0.03~0.07 mm.

Preferably, the explosion-proof stamp comprises a negative indicator disposed on the outer end face of the end, distal to the first opening, of the first cover body, and/or a positive indicator disposed on the outer end face of the end, distal to the opening, of the second cover body.

Preferably, the first cover body comprises a first body and a first boss provided at one end, distal to the first opening, of the first body;
the negative indicator is disposed on an outer end face of the first boss;
the second cover body comprises a second body and a second boss provided at one end, distal to the second opening, of the second body;
the positive indicator is disposed on an outer end face of the second boss.

Preferably, the battery housing is a metal housing.

Preferably, the cell further comprises an insulating rod penetrating through the cell;

the cell comprises a central through-hole through which the insulating rod penetrates;

the positive lug and the negative lug respectively has a first state where the lug protrudes out of an end face of the cell and forms a set included angle with the end face of the cell, and a second state where the lug presses downwards towards the cell under the action of external force to abut against an end part of the insulating rod and is attached to an inner wall of the battery housing.

Preferably, the positive lug and the negative lug are respectively positioned on two opposite sides of the central through-hole;

and the set included angle is 0~90 degrees.

Preferably, a length of the insulating rod is greater than or equal to a depth of the central through-hole;

an outer diameter of the insulating rod is smaller than or equal to an inner diameter of the central through-hole.

Preferably, lengths of the positive and negative lugs, respectively, are greater than a radius of the cell and smaller than or equal to a diameter of the cell.

Preferably, the battery housing comprises the housing top and the housing cup matched with the housing top;

in the second state, the negative lug is attached to an inner wall surface of the housing top, and the positive lug is attached to an inner wall surface of the housing cup.

Preferably, the insulating rod comprises a main body part and two end parts arranged at two ends of the main body part;

the main body part is made of a metal material, and the end part is made of an insulating material;

or the whole insulating rod is made of an insulating material.

The invention further provides a preparation method of the lithium ion cell composite flat sheet, comprising:

S1, preparing a positive piece coated with a positive material;

S2, preparing a negative piece coated with a negative material;

S3, providing a first separator and a second separator, coating a hot-melt material on one side of the first separator, and coating the hot-melt material on two sides of the second separator, respectively; and S4, stacking the first separator coated with the hot-melt material on one side to one side of the positive piece and arranging the side, coated with the hot-melt material, of the first separator to face the positive piece, stacking the second separator coated with the hot-melt material on two sides to the other side of the positive piece, stacking the negative piece to the side, opposite to the positive piece, of the second separator, and hot-laminating the first separator, the positive piece, the second separator and the negative piece to form a composite flat sheet with an integrated structure.

Preferably, step S1 comprises:

S1.1, uniformly mixing a positive active material, a conductive agent and a binder to prepare the positive material;

S1.2, coating the positive material on a positive substrate;

S1.3, pressing the positive substrate coated with the positive material to prepare the positive piece;

wherein the positive active material, the conductive agent and the binder are 94~98, 1~3 and 1~3 parts by weight, respectively;

the positive active material comprises one or more of lithium cobaltate, ternary nickel cobalt lithium manganate and lithium manganate;

the binder comprises polyvinylidene fluoride;

the conductive agent comprises nano carbon black.

Preferably, step S2 comprises:

S2.1, uniformly mixing a negative active material, the conductive agent and the binder to prepare the negative material;

S2.2, coating the negative material on a negative substrate;

S2.3, pressing the negative substrate coated with the negative material to prepare the negative piece;

wherein the negative active material, the conductive agent and the binder are 94~98, 1~3 and 1~3 parts by weight, respectively;

the negative active material comprises one or more of graphite, silicon carbon and lithium titanate;

the binder comprises one or more of polyvinylidene fluoride, styrene butadiene rubber and sodium carboxymethylcellulose;

the conductive agent comprises nano carbon black.

Preferably, step S4 comprises:

S4.1, winding the positive piece prepared in step S1 to form a positive piece roll, placing the positive piece roll on a first feeding component of the laminating and piece-making device of a lithium battery, and then pulling the positive piece to a space between two heating rollers of a laminating component;

S4.2, winding the first separator coated with the hot-melt material on one side to form a first separator roll, placing the first separator roll on a second feeding component, located on the outermost side, of the laminating and piece-making device of the lithium battery, pulling the first separator to the space between the two heating rollers of the laminating component, stacking onto one side of the first separator, and arranging one side, coated with the hot-melt material, of the first separator to face the positive piece;

S4.3, winding the second separator coated with the hot-melt material on two sides to form a second separator roll, placing the second separator roll on a second feeding component, located in the middle, of the laminating and piece-making device of the lithium battery, pulling the second separator to the space between the two heating rollers of the laminating component, and stacking onto the other side of the positive piece;

S4.4, winding the negative piece prepared in step S2 to form a negative piece roll, placing the negative piece roll on a third feeding component of the laminating and piece-making device of the lithium battery, pulling the negative piece to the space between the two heating rollers of the laminating component, and stacking onto one side, opposite to the positive piece, of the second separator;

S4.5, starting the laminating component, driving the first separator, the positive piece, the second separator and the negative piece to move forwards together through rotation of the heating rollers, heating through the heating rollers, and applying pressure to the first separator, the positive piece, the second separator and the negative piece to enable the hot-melt material on the first separator and the hot-melt material on the second separator to melt and hot-laminate the first separator, the positive piece, the second separator and the negative piece to form a composite flat sheet with an integrated structure;

wherein the first separator and the second separator are aligned before the hot-lamination.

Preferably, in step S4, the hot-lamination is conducted at a temperature of 45~85° C.;

and/or a pressure imposed on the composite flat sheet when conducting the hot-lamination is 1 T~2 T;
and/or a protective sleeve is fitted on the heating roller of the laminating component;
and/or, the hot-melt material comprises polyvinylidene fluoride-hexafluoropropylene copolymer.

Preferably, in step S4.5, before starting the laminating component, a positive lug is further provided on the positive piece; and a negative lug is provided on the negative piece.

The invention further provides a preparation method of a button lithium ion battery, comprising:

S1, preparing a positive piece coated with a positive material;
S2, preparing a negative piece coated with a negative material;
S3, providing a first separator and a second separator, coating a hot-melt material on one side of the first separator, and coating the hot-melt material on two sides of the second separator, respectively; and
S4, stacking the first separator coated with the hot-melt material on one side to one side of the positive piece and arranging the side, coated with the hot-melt material, of the first separator to face the positive piece, stacking the second separator coated with the hot-melt material on two sides to the other side of the positive piece, stacking the negative piece to the side, opposite to the positive piece, of the second separator, and hot-laminating the first separator, the positive piece, the second separator and the negative piece to form a composite flat sheet with an integrated structure;
S5, winding the composite flat sheet to form a cell, placing the cell into a battery housing, and then performing liquid injection and sealing to obtain the button lithium ion battery;

Preferably, step S1 comprises:
S1.1, uniformly mixing a positive active material, a conductive agent and a binder to prepare the positive material;
S1.2, coating the positive material on a positive substrate;
S1.3, pressing the positive substrate coated with the positive material to prepare the positive piece;
wherein the positive active material, the conductive agent and the binder are 94~98, 1~3 and 1~3 parts by weight, respectively;
the positive active material comprises one or more of lithium cobaltate, ternary nickel cobalt lithium manganate and lithium manganate;
the binder comprises polyvinylidene fluoride;
the conductive agent includes nano carbon black.

Preferably, the step S2 comprises:
S2.1, uniformly mixing a negative active material, a conductive agent and a binder to prepare the negative material;
S2.2, coating the negative material on a negative substrate;
S2.3, pressing the negative substrate coated with the negative material to prepare the negative piece;
wherein the negative active material, the conductive agent and the binder are 94~98, 1~3 and 1~3 parts by weight, respectively;
the negative active material comprises one or more of graphite, silicon carbon and lithium titanate;
the binder comprises one or more of polyvinylidene fluoride, styrene butadiene rubber and sodium carboxymethylcellulose;
the conductive agent comprises nano carbon black.

Preferably, step S4 comprises:
S4.1, winding the positive piece prepared in step S1 to form a positive piece roll, placing the positive piece roll on a first feeding component of a laminating and piece-making device of a lithium battery, and then pulling the positive piece to a space between two heating rollers of a laminating component;
S4.2, winding the first separator coated with the hot-melt material on one side to form a first separator roll, placing the first separator roll on a second feeding component, located on the outermost side, of the laminating and piece-making device of the lithium battery, pulling the first separator to the space between the two heating rollers of the laminating component, stacking onto one side of the first separator, and arranging one side, coated with the hot-melt material, of the first separator to face the positive piece;
S4.3, winding the second separator coated with the hot-melt material on two sides to form a second separator roll, placing the second separator roll on a second feeding component, located in the middle, of the laminating and piece-making device of the lithium battery, pulling the second separator to the space between the two heating rollers of the laminating component, and stacking onto the other side of the positive piece;
S4.4, winding the negative piece prepared in step S2 to form a negative piece roll, placing the negative piece roll on a third feeding component of the laminating and piece-making device of the lithium battery, pulling the negative piece to the space between the two heating rollers of the laminating component, and stacking onto one side, opposite to the positive piece, of the second separator;
S4.5, starting the laminating component, driving the first separator, the positive piece, the second separator and the negative piece to move forwards together through rotation of the heating rollers, heating through the heating rollers, and applying pressure to the first separator, the positive piece, the second separator and the negative piece to enable the hot-melt material on the first separator and the hot-melt material on the second separator to melt and hot-laminate the first separator, the positive piece, the second separator and the negative piece to form a composite flat sheet with an integrated structure;
wherein the first separator and the second separator are aligned before the hot-lamination.

Preferably, in step S4, the hot-lamination is conducted at a temperature of 45~85° C.;
and/or a pressure imposed on the composite flat sheet (100) when conducting the hot-lamination is 1 T~2 T;
and/or a protective sleeve is fitted on the heating roller of the laminating component;
and/or, the hot-melt material comprises polyvinylidene fluoride-hexafluoropropylene copolymer.

Preferably, in step S4.5, before starting the laminating component, a positive lug is further provided on the positive piece; and a negative lug is provided on the negative piece.

The button lithium ion battery provided by the invention has the following advantageous effects: the cell of the button lithium ion battery is formed by winding a composite flat sheet in which a first separator, a positive piece, a second separator and a negative piece are sequentially stacked to form an integrated structure, so that winding efficiency can be improved, and misalignment of the first separator, the positive piece, the second separator and the negative piece can be avoided; moreover, chances of hand contact can be reduced, the influence of dust and water vapor can be avoided, and the quality of the lithium battery can be improved to the maximum extent; furthermore, the die cutting process can be omitted, so that the generation of burrs can be reduced, and the risk of low-voltage short circuit of the battery can be avoided.

BRIEF DESCRIPTION OF THE DRAWINGS

The present invention will now be further described with reference to the accompanying drawings and embodiments, in which.

DETAILED DESCRIPTION OF THE INVENTION

In order that the technical features, object, and effects of the present invention may be more clearly understood, specific embodiments thereof will now be described in detail with reference to the accompanying drawings.

Figure 1:
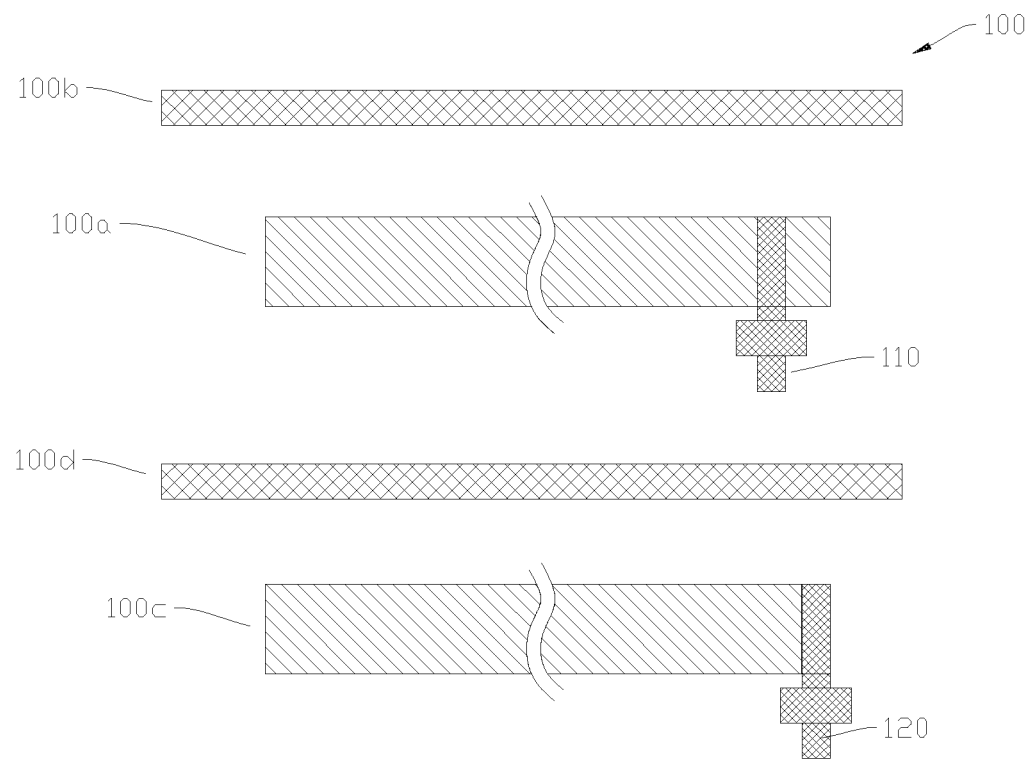
FIG. 1 is an exploded view showing a structure of a composite flat sheet in a first embodiment of a button lithium ion battery according to the present invention.
Figure 2:
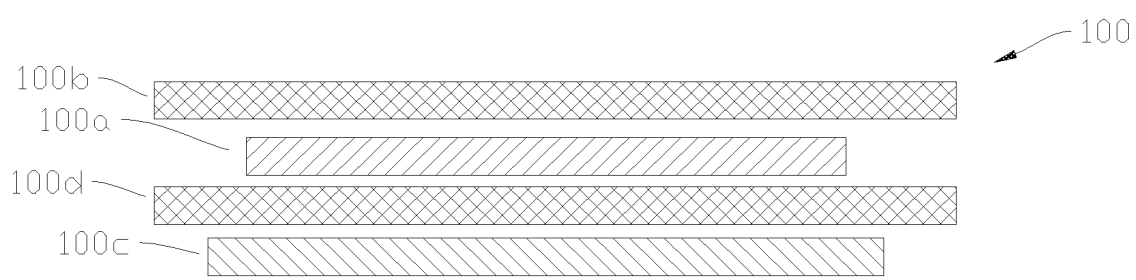
FIG. 2 is a cross-sectional view of the composite flat sheet shown in FIG. 1.
Figure 3:
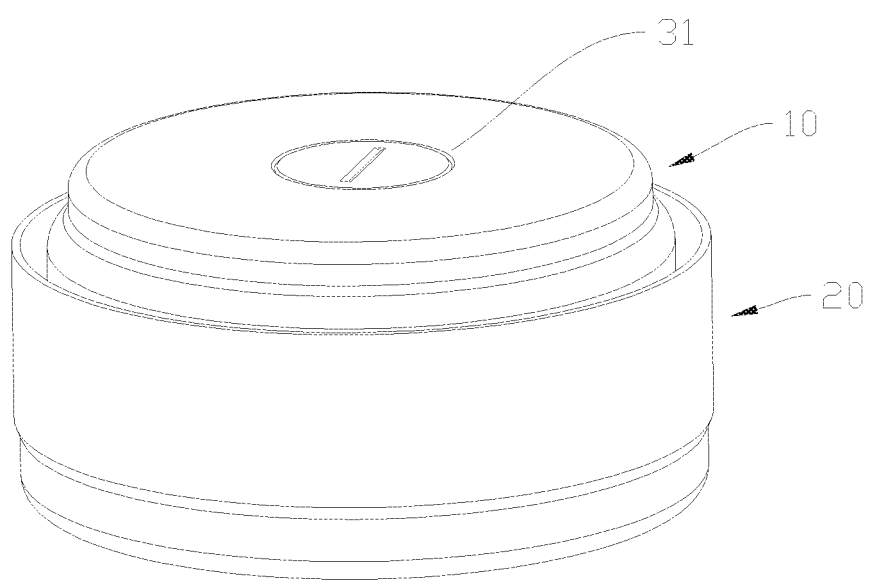
FIG. 3 is a perspective view showing a structure of the first embodiment of the button lithium ion battery of the present invention.
Figure 4:
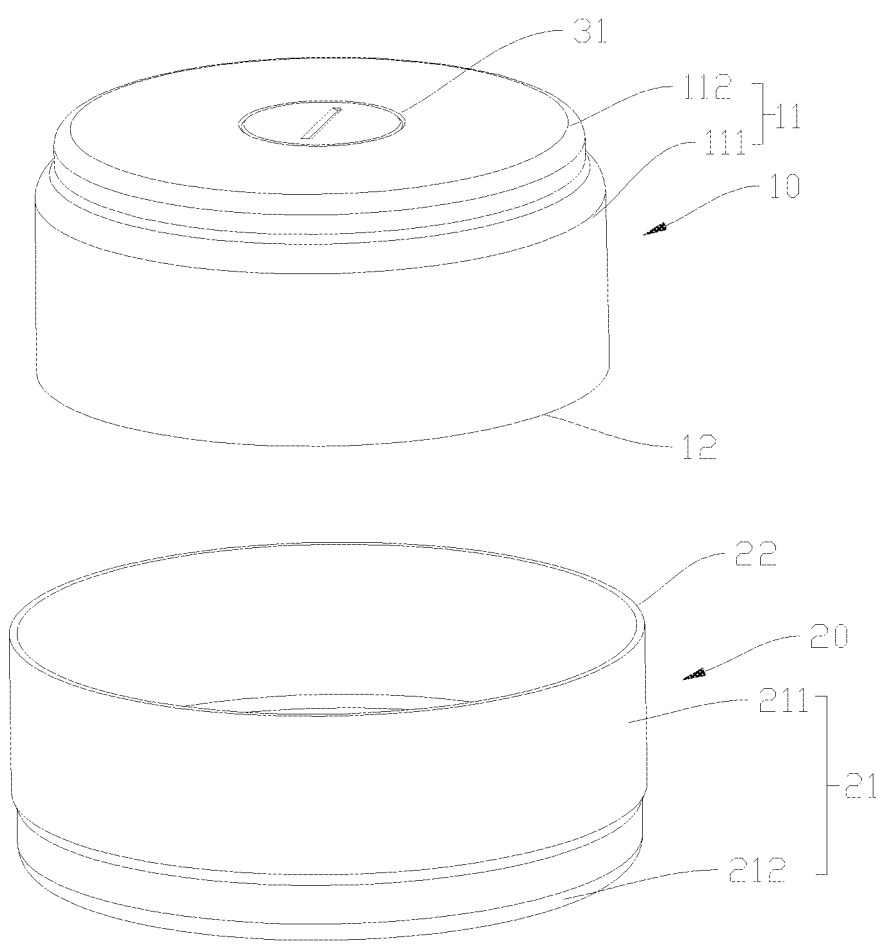
FIG. 4 is an exploded view showing a structure of a battery housing of the button lithium ion battery shown in FIG. 3.
Figure 5:
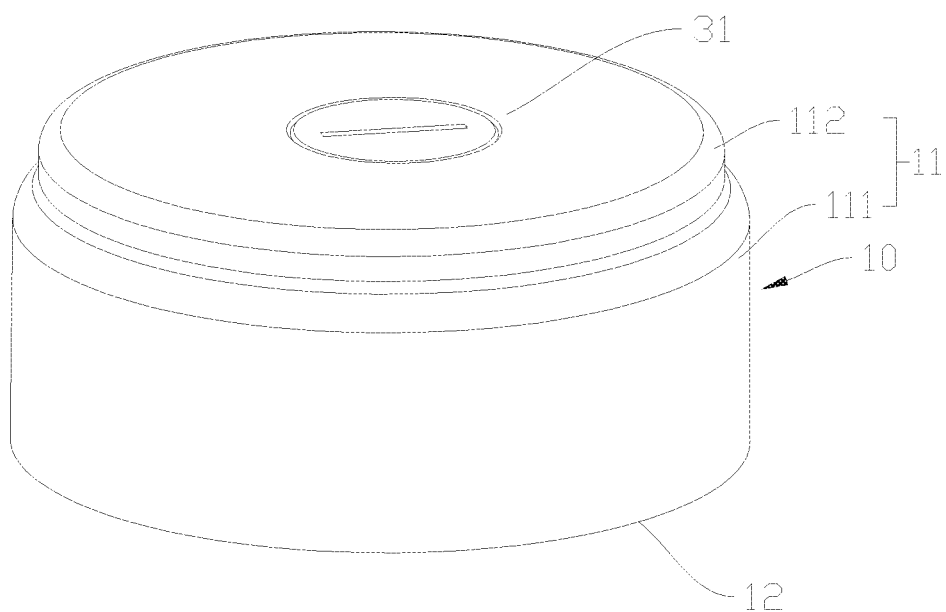
FIG. 5 is a perspective view showing a structure of a housing top of the battery housing shown in FIG. 4.
Figure 6:
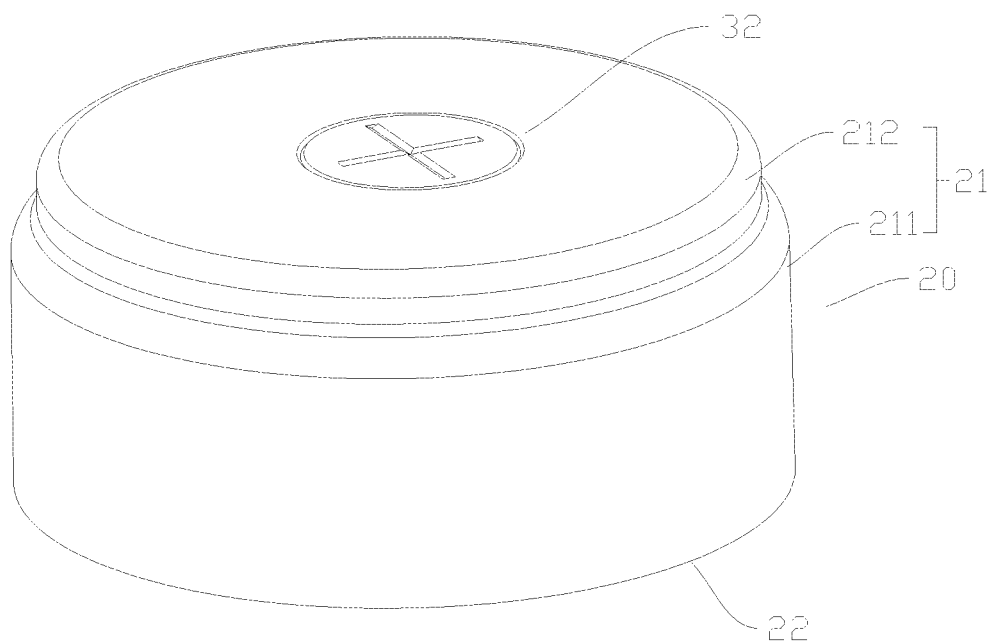
FIG. 6 is a perspective view showing a structure of a housing cup of the battery housing shown in FIG. 4.
Figure 7:
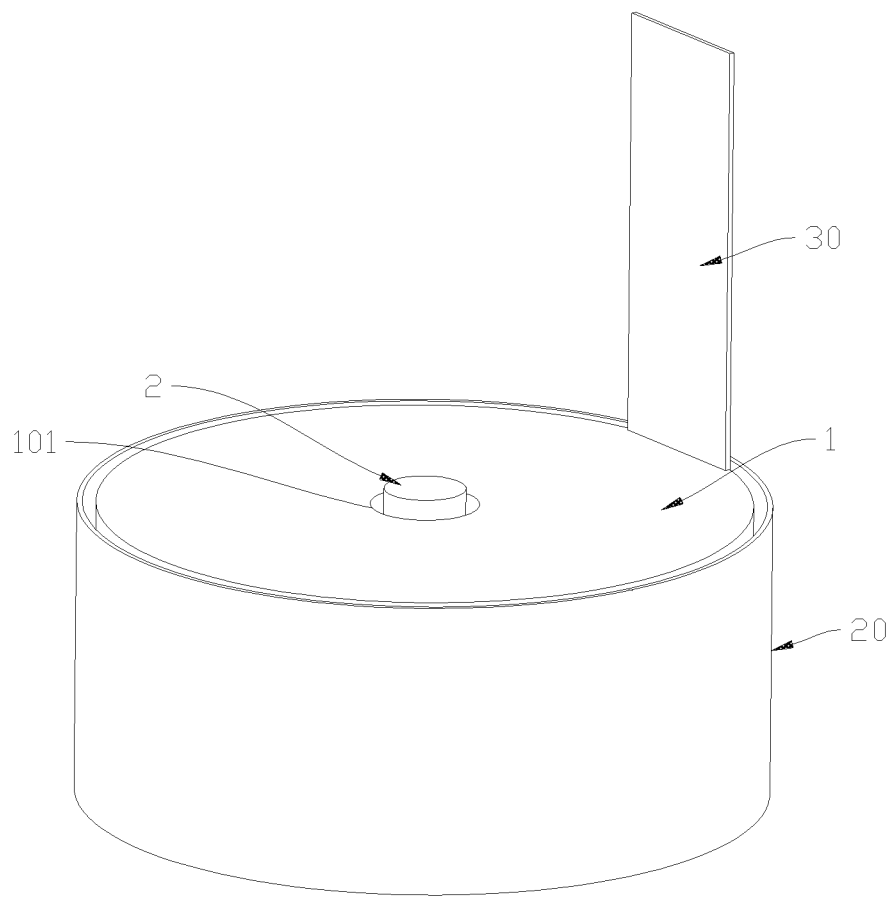
FIG. 7 is a schematic view showing a structure of a negative lug in a first state in a second embodiment of the button lithium ion battery of the present invention.
Figure 8:
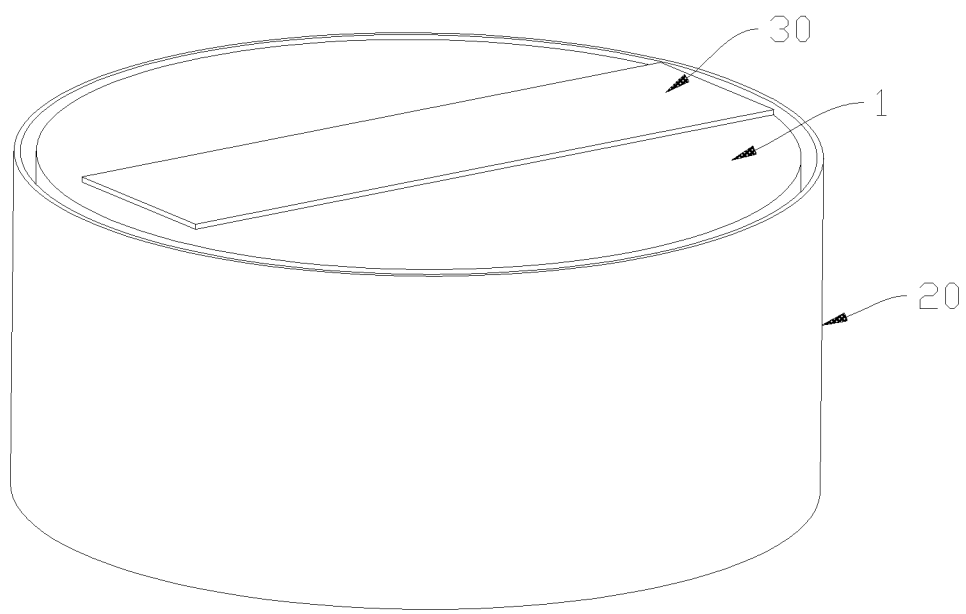
FIG. 8 is a schematic view showing a structure of the positive lug and the negative lug of the button lithium ion battery shown in FIG. 7 in a second state, respectively.
Figure 9:
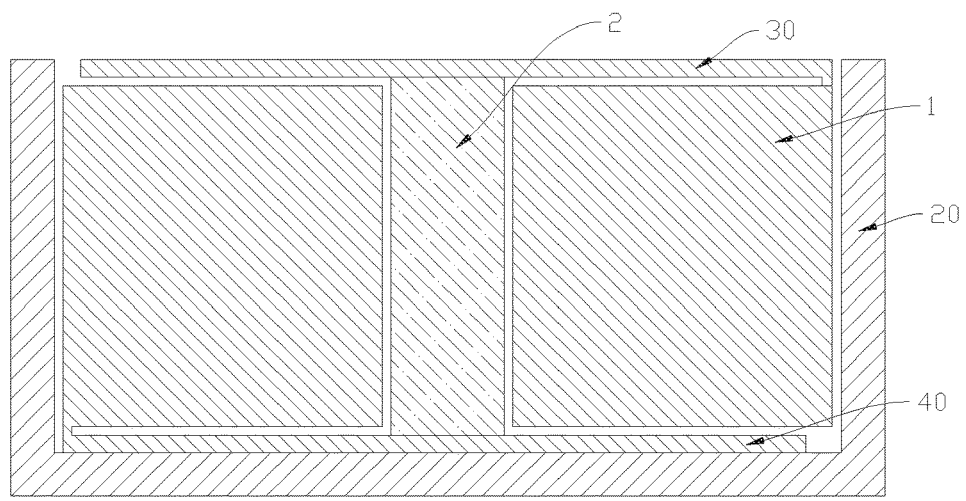
FIG. 9 is a cross-sectional view of the positive lug and the negative lug of the button lithium ion battery shown in FIG. 8 in the second state, respectively.
Figure 10:
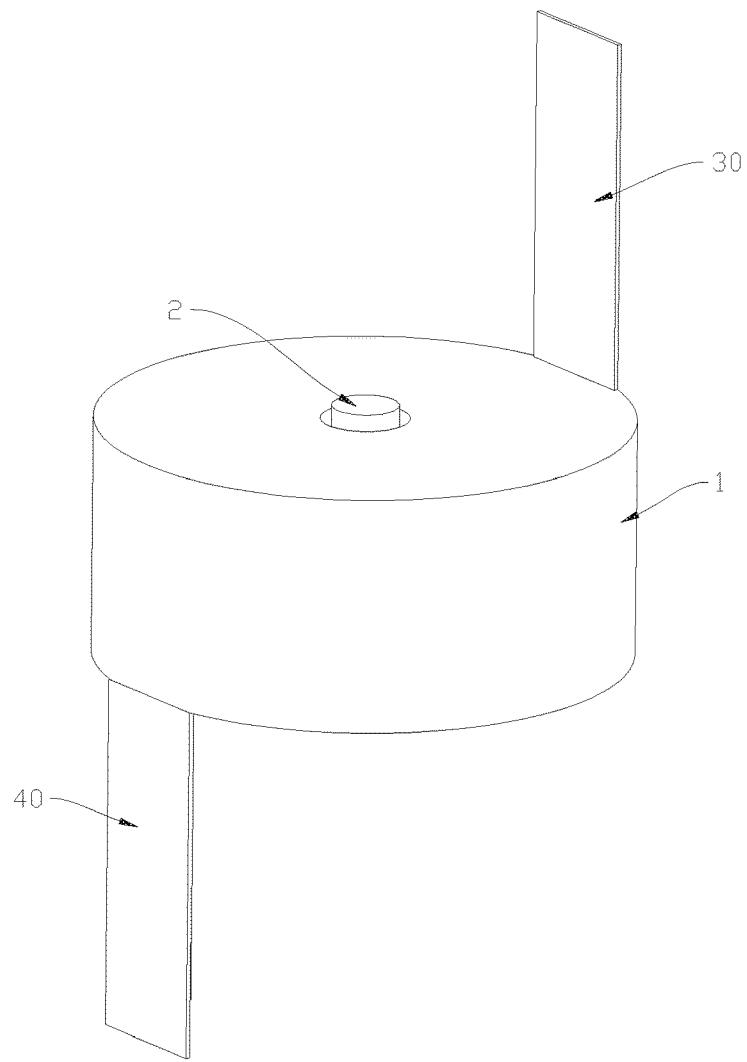
FIG. 10 is a schematic view showing a structure of the positive lug and the negative lug shown in FIG. 8 in the first state, respectively.

FIGS. 1 and 2 show a first embodiment of the button lithium ion battery of the present invention. The button lithium ion battery has wide-spread use in various fields, such as 3C digital, intelligent wearing, electric automobiles, medical treatment, military and the like, featuring simple structure, convenience and high efficiency in assembly. In some embodiments, the button lithium ion battery may be a button battery.

Furthermore, in some embodiments, the button lithium ion battery may include a battery housing, a cell, and an electrolyte. An accommodating cavity can be formed inside the battery housing and can be used for accommodating the cell; the cell may be disposed in the battery housing for generating electrical energy. The electrolyte may be filled in the battery housing. In some embodiments, the button lithium ion battery may have a cylindrical shape with a diameter of 3~20 mm and a thickness of 30~80 mm, which may form batteries 12540, 10540 and 16540. Of course, it is to be understood that in other embodiments, the shape and size of the button lithium ion battery are not limited to those described above, and that the button lithium ion battery may be fabricated as a button lithium ion battery for cell phone and digital products, a square polymer button lithium ion battery, etc.

As shown in FIGS. 1 and 2, furthermore, in some embodiments, the battery housing may have a cylindrical shape. It is to be understood that in other embodiments, the shape of the battery housing is not limited to a cylindrical shape, and may be a rectangular parallelepiped shape or other shapes. The inner diameter of the battery housing may be adapted to the outer diameter of the cell. The battery housing may be made of metal, and in particular, the battery housing may be a steel housing. In some embodiments, the battery housing may include a housing top 10 and a housing cup 20. The housing top 10 may be fitted around the cell component. The housing cup 20 can be fitted around the housing top 10 and can be assembled with the housing top 10 to form a closed accommodating cavity for accommodating the cell component.

As shown in FIGS. 3 to 6, furthermore, in some embodiments, the housing top 10 may include a first cover body 11 and a first opening 12. The first cover body 11 has a hollow structure, and an accommodating cavity may be formed inside the first cover body 11. The first opening 12 may be disposed at one end of the first cover body 11 and may be communicated with the accommodating cavity, and the first opening 12 may be used for allowing the cell component to be accommodated in the accommodating cavity.

In some embodiments, the first cover body 11 may include a first body 111 and a first boss 112. The first body 111 may have a cylindrical shape, the inner diameter of which may be adapted to the outer diameter of the cell, and in particular, the inner diameter of which may be slightly larger than the outer diameter of the cell. The first boss 112 may be provided at an end, distal to the first opening 12, of the first body 111, and may be integrally formed with the first body 111. Specifically, in some embodiments, the first boss 112 may be formed by stretch molding with the first body 111. In some embodiments, the first boss 112 may be circular in cross-section with a radial dimension smaller than the radial dimension of the first body 111. In some embodiments, the end, distal to the opening, of the first cover 11 may correspond to a negative electrode of the button lithium ion battery, and in particular, the first boss 112 may correspond to the negative electrode of the cell component and may form a negative terminal.

Furthermore, in some embodiments, the housing cup 20 may include a second cover 21 and a second opening 22. The second cover body 21 has a hollow structure, and an accommodating cavity may be formed inside the second cover body 21. The size of the second cover body 21 may be slightly larger than that of the first cover body 11, and the second cover body 21 may be fitted around the first cover body 11 from the first opening 12 of the first cover body 11 towards the first boss 112 on the first cover body 11. The second opening 22 may be provided at one end of the second cover 21, may communicate with the accommodating cavity, and may be used for allowing the first cover body 11 to be accommodated in the accommodating cavity.

In some embodiments, the second cover 21 may include a second body 211 and a second boss 212. The second body 211 may have a cylindrical shape, the inner diameter of which may be adapted to the outer diameter of the first body 111, and in particular, the inner diameter of which may be slightly larger than the outer diameter of the first body 111. The second boss 212 may be provided at an end, distal to the second opening 22, of the second body 211, and may be integrally formed with the second body 211. Specifically, in some embodiments, the second boss 212 may be formed by stretch molding with the second body 211. In some embodiments, the second boss 212 may be circular in cross-section with a radial dimension smaller than the radial dimension of the second body 221. In some embodiments, the end, distal to the second opening 22, of the second cover 21 may correspond to the positive electrode of the button lithium ion battery, and in particular, the second boss 212 may correspond to the positive electrode of the cell component and may form a positive terminal.

Furthermore, in some embodiments, the battery housing may also include an explosion-proof structure. The explosion-proof structure can enable the battery housing to have an explosion-proof capability, so that explosion-proof may be realized in the button lithium ion battery using process and under an abnormal condition, the safety performance of the button lithium ion battery can be improved, and the physical safety of a user may be guaranteed. In some embodiments, the explosion-proof structure may be formed by stretch molding on the outer end face of the end, distal to the first opening 12, of the first cover body 11 and the outer end face of the end, distal to the second opening 22, of the second cover body 21, in particular, the explosion-proof structure may be formed on the outer end face of the first boss 112 and the outer end face of the second boss 212, respectively. The explosion-proof structure is provided on the outer end faces of both the first boss 112 and the second boss 212, a double explosion-proof assurance is enabled, the safety performance of the button lithium ion battery is ensured, and it should be understood that the explosion-proof structure may be provided only on the outer end face of the end, distal to the first opening 12, of the first cover body 11 or the outer end face of the end, distal to the second opening 22, of the second cover body 21. The so-called forming by stretch molding is a stamping processing method for molding a flat plate blank into a hollow structure by using a die, which is a common molding process.

Furthermore, in some embodiments, the explosion-proof structure may be an explosion-proof stamp formed by stretch molding on the outer end face, distal to the first opening 12, of the first cover 11 and the outer end face, distal to the opening, of the second cover 21 to reduce the thicknesses of the first cover 11 and the second cover 12. The shapes of the explosion-proof stamps on the first cover 11 and the second cover 21 may be different. In some embodiments, the explosion-proof stamp may have a width of 0.1~0.2 mm, and in some embodiments, specifically, the explosion-proof stamp may have a width of 0.15 mm. In some embodiments, the explosion-proof stamp may have a depth of 0.03~0.07 mm, and in some embodiments, specifically, the explosion-proof stamp may have a depth of 0.05 mm.

Furthermore, in some embodiments, in conjunction with the positive and negative polarity characteristics of the button lithium ion battery, the explosion-proof stamp may be formed as a negative indicator 31 and a positive indicator 32. The negative indicator 31 is located on the outer end face of the end, distal to the first opening 12, of the first cover body 11, in particular on the outer end face of the first boss 112, and may correspond to the negative electrode of the cell component and have a shape of "⊖". The positive indicator 32 may be disposed on the outer end face of the end, distal to the opening, of the second cover body 21, specifically on the outer end face of the second boss 212, and may correspond to the positive electrode of the cell component and have a shape of "⊕". By configuring the explosion-proof stamp as the negative indicator 31 and the positive indicator 32, a reverse connection between the positive electrode and the negative electrode by a user may be effectively avoided, and thus reverse charging is avoided, thereby improving assembly efficiency and correctness.

As further shown in FIGS. 1 and 2, furthermore, in some embodiments, the cell may include a composite flat sheet 100, which may be formed by winding on a winding device. The composite flat sheet 100 may include a first separator 100b, a positive piece 100a, a second separator 100d and a negative piece 100c which are sequentially stacked; the first separator 100b, the positive piece 100a, the second separator 100d, and the negative piece 100c are sequentially stacked and are hot-laminated on a laminating and piece-making device of the present invention to form an integrated structure, thereby forming the composite flat sheet 100. In the hot-lamination process, the temperature of the hot-lamination may be controlled at 45~85° C., and in the hot-lamination process, the pressure applied by 52 to the composite flat sheet 100 may be 1 T~2 T. The composite flat sheet 100 is adopted by the cell for winding, so that the winding efficiency may be improved, the misalignment of the first separator 100b, the positive piece 100a, the second separator 100d and the negative piece 100c may be avoided; moreover, chances of hand contact can be reduced, the influence of dust and water vapor can be avoided, and the quality of the lithium battery can be improved to the maximum extent. Furthermore, in some embodiments, the width of the composite flat sheet 100 may be 2~350 mm, and the width may be smaller than or equal to the height of the accommodating cavity inside the battery housing. The composite flat sheet 100 is formed by hot-lamination, so that a die cutting process may be omitted, burrs may be reduced, and the risk of low-voltage short circuit of the battery may be avoided.

Furthermore, in some embodiments, the positive piece 100a may include a positive substrate and a positive material coated on the positive substrate. The positive substrate may be a current collector of an aluminum foil, and may be in the shape of a strip. The positive material may be uniformly coated on the positive substrate. In some embodiments. The positive material may include a positive active material, a conductive agent, and a binder. Wherein the positive active material, the conductive agent and the binder are 94~98, 1~3 and 1~3 parts by weight, respectively. The positive active material, the conductive agent, and the binder may be mixed to form the positive material. Wherein the positive active material may include one or more of lithium cobaltate, ternary nickel cobalt manganate and lithium manganate; the binder may include polyvinylidene fluoride (PVDF); the conductive agent may include nano carbon black. Furthermore, in some embodiments, the width of the positive piece 100a may be 3~300 mm, and in some embodiments, the width of the positive piece 100a may alternatively be 3~10 mm.

Furthermore, in some embodiments, the negative piece 100c may include a negative substrate and a negative material coated on the negative substrate. The negative substrate may be a current collector of a copper foil, and may also be in the shape of a strip. The negative material may be uniformly coated on the negative substrate. In some embodiments, the negative material may include a negative active material, a conductive agent, and a binder. Wherein the negative active material, the conductive agent and the binder are 94~98, 1~3 and 1~3 parts by weight, respectively. The negative active material, the conductive agent, and the binder may be mixed to form a negative material. Wherein the negative active material may be one or more of graphite, silicon carbon and lithium titanate; the binder may include one or more of polyvinylidene fluoride (PVDF), styrene-butadiene rubber (SBR), and sodium carboxymethylcellulose (CMC); the conductive agent may be nano carbon black. Furthermore, in some embodiments, the width of the negative piece 100c may be 3~300 mm, and in some embodiments, the width of the negative piece 100c may alternatively be 3~10 mm.

Furthermore, in some embodiments, two ends of the cell may also be provided with a positive lug 110 and a negative lug 120, respectively. The positive lug 110 may be disposed on the positive lug 100a by ultrasonic welding or laser welding and located in the foil-free area of the positive lug 100a prior to hot-laminating the positive lug 100a. The positive lug 110 may be an aluminum metal strip. The negative lug 120 may be disposed on the negative lug 100c by ultrasonic welding or laser welding and located in the foil-free area of the negative lug 100c prior to hot-laminating the negative lug 100b, and may be a copper metal strip. After the positive piece 100a and the negative piece 100b are hot-laminated, the positive lug 110 and the negative lug 120 may be positioned at two opposite sides, so that the positive lug 110 and the negative lug 120 of the cell formed by winding may be respectively positioned at two ends.

Furthermore, in some embodiments, the first separator 100b may be disposed on one side of the positive piece 100a and at the uppermost layer of the composite flat sheet 100. One side of the first separator 100b is coated with a hot-melt material. The hot-melt material may be coated on a side, facing the positive piece 100a, of the first separator 100b. The hot-melt material may be a hot-melt adhesive, which may be melted in a heated state to rapidly bond the first separator 100b and the positive piece 100a. Specifically, in some embodiments, the hot-melt material may be polyvinylidene fluoride hexafluoropropylene (PVDF-HFP). It will be appreciated that in other embodiments, the hot-melt material is not limited to polyvinylidene fluoride hexafluoropropylene (PVDF-HFP).

Furthermore, in some embodiments, the second separator 100b may be disposed between the positive piece 100a and the negative piece 100c, two sides of which are coated with the hot-melt material that may be melted in a heated state to rapidly bond the second separator 100b to the positive piece 100a and the negative piece 1000c, respectively. Specifically, in some embodiments, the hot-melt material may be polyvinylidene fluoride hexafluoropropylene (PVDF-HFP). It will be appreciated that in other embodiments, the hot-melt material is not limited to polyvinylidene fluoride hexafluoropropylene (PVDF-HFP). In some embodiments, the first separator 100b and the second separator 100d may be aligned to facilitate hot-lamination and to make the prepared composite flat sheet 100 more aesthetically pleasing.

FIGS. 7 to 10 show a second embodiment of the button lithium ion battery of the present invention, which differs from the first embodiment in that the cell 1 may include a central through-hole 101 disposed in an axial direction, an inner diameter of which may be larger than an outer diameter of the insulating rod 2 for the insulating rod to pass through.

Furthermore, in some embodiments, the shape and the size of the insulating rod 2 are equivalent to the shape and the size of the central through-hole 101. In some embodiments, the insulating rod 2 may have a cylindrical shape, the length of the insulating rod 2 may be greater than the depth of the central through-hole 101, two ends of the insulating rod 2 may pass through and out of the central through-hole, and the insulating rod 2 may be used to support the positive lug 40 and the negative lug 30 so that the positive lug 40 and the negative lug 30 may be in close contact with the inner wall of the battery housing when the battery housing is assembled. Specifically, in some embodiments, the length of the insulating rod may be equal to the difference between the internal height of the battery housing minus the thickness of the positive lug 40 and the internal height of the battery housing minus the thickness of the negative lug 30; it should be understood that in other embodiments, the length of the insulating rod 2 may also be equal to the depth of the central through-hole 101. In some embodiments, the outer diameter of the insulating rod 2 may be smaller than the inner diameter of the central through-hole 101, thereby facilitating penetration into the central through-hole 101. It will be appreciated that in other embodiments, the outer diameter of the insulating rod 2 may also be equal to the inner diameter of the central through-hole 101 to attach tightly to the inner sidewall of the central through-hole 101, thereby improving the stability of the assembly.

Furthermore, in some embodiments, the insulating rod 2 as a whole may be made of an insulating material. By way of example, the insulating rod 2 as a whole may be made of PP or PET. Of course, it is to be understood that in other embodiments, the insulating rod 2 is not limited to be made as a whole of an insulating material, but may be made of a combination of metal and an insulating material. The insulating rod 2 may include a main body part and end parts provided at two ends of the main body part. The length of the main body part is equivalent to the depth of the central through-hole, the main body part may be made of a metal material, and the end part of the main body part may be made of an insulating material.

Furthermore, in some embodiments, the negative lug 30 may be integrally formed with the negative lug and have a length greater than the radius of the cell 1 and smaller than the diameter of the cell 1 so as to cover the central through-hole 101. Of course, it will be appreciated that in other embodiments, the length of the negative lug 30 may be equal to the diameter of the cell 1. In some embodiments, the negative lug 30 may have a first state and a second state. The first state is a pre-assembly state. The second state is an assembled state. When the negative lug 30 is in the first state, the negative lug 30 can protrude out of the end face of the cell 1 and form a set included angle with the end face of the cell 1. Specifically, the negative lug 30 may be disposed perpendicular to the end face of the cell 1 at an angle of 90 deg., although it will be appreciated that in other embodiments the set included angle may not be limited to a right angle, the set included angle may be an acute angle between 0 deg. to 90 deg. When the negative lug 30 is in the second state, the negative lug 30 may be pressed downwards towards the cell 1 under the action of external force, contacts one end of the insulating rod 2, covers the central through-hole 101, abuts against the end of the insulating rod 2, and attaches to the inner wall of the battery housing, so that the negative lug 30 may be in close contact with the battery housing without welding, and further the stability of conduction may be improved.

Furthermore, in some embodiments, the positive lug 40 and the negative lug 30 may be located on two opposite sides of the central through-hole 101, respectively and oppositely disposed, and the positive lug 40 may be integrally formed with the positive piece and have a length greater than a radius of the cell 1 and smaller than a diameter of the cell 1 so as to cover the central through-hole 101. Of course, it will be appreciated that in other embodiments, the length of the positive lug 40 may be equal to the diameter of the cell 1. In some embodiments, the positive lug 40 may have a first state and a second state. The first state is a pre-assembly state. The second state is an assembled state. When the positive lug 40 is in the first state, the positive lug 40 can protrude out of the end face of the cell 1 and form a set included angle with the end face of the cell 1. Specifically, the positive lug 40 may be disposed perpendicular to the end face of the cell 1 at an angle of 90 deg., although it will be appreciated that in other embodiments the set included angle may not be limited to a right angle, the set included angle may be an acute angle between 0 deg. to 90 deg. When the positive lug 40 is in the second state, the positive lug 40 may be pressed downwards towards the cell 1 under the action of external force, contacts one end of the insulating rod 2, covers the central through-hole 101, abuts against the end of the insulating rod 2 and attaches to the inner wall of the battery housing, so that the positive lug 40 may be in close contact with the battery housing without welding, and further the stability of conduction can be improved.

Furthermore, in some embodiments, the battery housing may be cylindrical with an inner diameter adapted to the inner diameter of the wound cell. The battery housing may be made of metal, and in particular, the battery housing may be a steel housing. The battery housing may include a housing cup 20 and a housing top. The inner diameter of the housing cup 20 may be equivalent to the outer diameter of the housing top, and the inner diameter of the housing top may be equivalent to the inner diameter of the cell 1. The housing cup 20 may be fitted around the housing top, assembled with the housing top, and form an accommodating cavity with the housing top for accommodating the cell 1, the insulating rod 2, the positive lug 40 and the negative lug 30. When the positive lug 40 and the negative lug 40 are in a second state, the negative lug 30 may be attached to the inner wall surface of the housing top so as to be electrically connected with the housing top; and the positive lug 40 may be attached to the inner wall surface of the housing cup to electrically connected with the housing cup 20.

When the button lithium ion battery is to be assembled, the positive piece, the negative piece and the separator may be firstly stacked and combined to form a composite flat sheet, the composite flat sheet is then put into a winding machine to be wound to form a cell 1, an insulating rod 2 penetrates into the central through-hole of the cell 1, an external force is applied to the positive lug 40 to press the positive lug 40 downwards towards the cell 1 and enable the positive lug 40 to abut against the end part of one end of the insulating rod 2, the housing cup 20 of the battery housing is then fitted around the wound cell, an external force is applied to the negative lug 30 to press the negative lug 30 downwards towards the cell 1 and enable the negative lug 30 to abut against the end part of the other end of the insulating rod 2, the housing top of the battery housing is assembled, and the negative lug 30 and the positive lug 40 are attached to the inner wall of the housing top and the inner wall of the housing cup 20 with the support of the insulating rod 2, respectively. It will be appreciated that in other embodiments, the external force may be a manually applied force or a force applied by a machine, and in some embodiments, the sequence of pressing the negative lug 30 and the positive lug 40 and the sequence of assembling the housing cup 20 and the housing top are not limited to the sequence shown in this embodiment.

Figure 11:
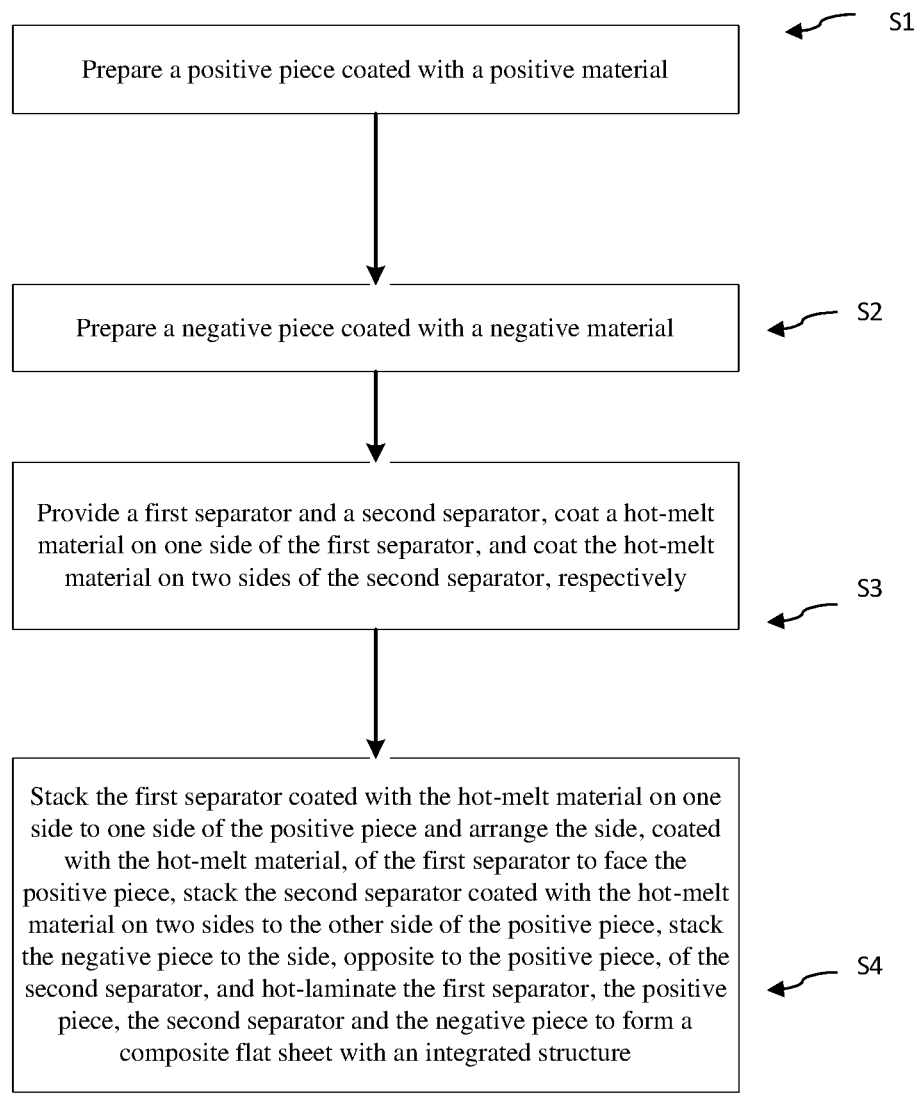
FIG. 11 is a process flow diagram of a method of producing a lithium ion cell composite flat sheet of the button lithium ion battery of the present invention.

FIG. 11 shows some preferred embodiments of a method for preparing a lithium ion cell composite flat sheet using a laminating and piece-making device for the lithium battery of the present invention. The preparation method of the lithium ion cell composite flat sheet includes the following steps:

S1, a positive piece coated with a positive material is prepared. In some embodiments, step S1 may include the following steps:

S1.1, a positive active material, a conductive agent and a binder are uniformly mixed to prepare the positive material; specifically, 94~98 parts by weight of the positive active material, 1~3 parts by weight of the conductive agent, and 1~3 parts by weight of the binder are added to a stirring barrel of a stirrer, and the stirrer is started to stir until the positive active material, the conductive agent, and the binder are uniformly mixed to obtain a positive slurry, wherein the positive active material is lithium cobaltate, it is to be understood that the positive active material may not be limited to lithium cobaltate, and may be ternary nickel cobalt lithium manganate or lithium manganate, or a combination of lithium cobaltate, ternary nickel cobalt lithium manganate and lithium manganate. Wherein the binder may be polyvinylidene fluoride. The conductive agent may be nano carbon black.

S1.2, the positive material is coated on a positive substrate; specifically, a current collector of an aluminum foil with the width of 3~10 mm is selected as the positive substrate, a foil-free area is reserved on the positive substrate at the edge close to one side of the positive substrate, and then the positive material is uniformly coated on the positive substrate and positioned outside the foil-free area.

S1.3, the positive substrate coated with the positive material is pressed to prepare the positive piece. Specifically, the positive substrate coated with the positive material is uniformly pressed by a double-roller machine, so that the positive piece is obtained.

S2, a negative piece coated with a negative material is prepared. In some embodiments, step S2 includes the following steps:

S2.1, the negative active material, the conductive agent and the binder are uniformly mixed to obtain the negative material; specifically, 94~98 parts by weight of the negative active material, 1~3 parts by weight of the conductive agent and 1~3 parts by weight of the binder are added into the stirring barrel of the stirring machine, and the stirring machine is started to stir until the negative active material, the conductive agent and the binder are uniformly mixed to obtain a negative slurry. Wherein the negative active material may be graphite. It will be appreciated that in other embodiments, the negative active material may not be limited to graphite, and may be silicon carbon or lithium titanate, or a combination of the three. The binder may be polyvinylidene fluoride, and it will be appreciated that that in other embodiments, the binder is not limited to polyvinylidene fluoride, and may be styrene-butadiene rubber or sodium carboxymethylcellulose, or a combination of the three; the conductive agent may be nano carbon black.

S2.2, the negative material is coated on a negative substrate; specifically, a current collector of a copper foil with the width of 3~10 mm is selected as the negative substrate, a foil-free area is reserved on the negative substrate at the edge close to one side of the negative substrate, and then the negative material is coated on the negative substrate and positioned outside the foil-free area.

S2.3, the negative substrate coated with the negative material is pressed to prepare the negative piece. Specifically, the negative substrate coated with the negative material is uniformly pressed by the double-roller machine, so that the negative piece is obtained.

S3, a first separator and a second separator are provided, a hot-melt material is coated on one side of the first separator, and the hot-melt material is coated on two sides of the second separator, respectively. The hot-melt material may be a hot-melt adhesive that can rapidly bond the first separator to the positive piece and bond the second separator to the positive piece and the negative piece in a heated state, so that the first separator, the positive piece, the second separator and the negative piece may be hot-laminated to form an integrated structure. Specifically, in some embodiments, the hot-melt material may be a polyvinylidene fluoride-hexafluoropropylene copolymer.

S4, the first separator coated with the hot-melt material on one side is stacked to one side of the positive piece and arranging the side, coated with the hot-melt material, of the first separator to face the positive piece, the second separator coated with the hot-melt material on two sides is stacked to the other side of the positive piece, the negative piece is stacked to the side, opposite to the positive piece, of the second separator, and the first separator, the positive piece, the second separator and the negative piece are hot-laminated to form a composite flat sheet with an integrated structure. In some embodiments, step S4 may include the following steps:

S4.1, the positive piece prepared in step S1 is wound to form a positive piece roll, the positive piece roll is placed on a first feeding component of the laminating and piece-making device of a lithium battery, and then the positive piece is pulled to a space between two heating rollers of a laminating component; specifically, the positive piece is placed into a winding machine, the winding machine is started to wind the positive piece to form the positive piece roll, the positive piece roll is integrally fitted around a first feeding roller of the laminating and piece-making device; the positive piece is pulled out to pass through the upper one of two first conveying rollers arranged perpendicular to the feeding direction, to pass through a first tensioning wheel and to be wound to the other first conveying roller configured perpendicular to the feeding direction; the positive piece sequentially passes through three first conveying rollers arranged at intervals along the feeding direction, and finally penetrates into the space between the two heating rollers.

S4.2, the first separator coated with the hot-melt material on one side is wound to form a first separator roll, the first separator roll is placed on a second feeding component, located on the outermost side, of the laminating and piece-making device of the lithium battery, the first separator is pulled to the space between the two heating rollers of the laminating component, the first separator is stacked on one side of the positive piece, and one side, coated with the hot-melt material, of the first separator is arranged to face the positive piece; specifically, the first separator is placed on the winding machine, the winding machine is started to wind the first separator to form the first separator roll, the first separator roll is then integrally fitted around a second feeding roller located at the outermost side of the laminating and piece-making device, the first separator is pulled out, and one side thereof coated with the hot-melt material is arranged opposite to the positive piece; the first separator is enabled to pass through the upper one of two second conveying rollers arranged perpendicular to the feeding direction, to pass through a second tensioning wheel, and to be wound to the other second conveying roller configured perpendicular to the feeding direction; the first separator then sequentially passes through the two second conveying rollers arranged at intervals along the feeding direction, and finally penetrates into the space betweens from one side of the positive piece.

S4.3, the second separator coated with the hot-melt material on two sides is wound to form a second separator roll, the second separator roll is placed on a second feeding component, located in the middle, of the laminating and piece-making device of the lithium battery, the second separator is pulled to the space between the two heating rollers of the laminating component and stacked onto the other side of the positive piece; specifically, a second separator is placed on a winding machine, the winding machine is started to wind the second separator to form a second separator roll, the second separator roll is integrally fitted around a second feeding roller located in the middle of the laminating and piece-making device, the second separator is pulled out to pass through the upper one of two second conveying rollers arranged perpendicular to the feeding direction, to passes through a second tensioning wheel, and to be wound to the other second conveying roller configured perpendicular to the feeding direction; the second separator sequentially passes through two second conveying rollers arranged at intervals along the feeding direction, and finally penetrates into the space betweens from the other side of the positive piece.

S4.4, the negative piece prepared in step S2 is wound to form a negative piece roll, the negative piece roll is placed on a third feeding component of the laminating and piece-making device of the lithium battery, the negative piece is pulled to the space between the two heating rollers of the laminating component and stacked onto one side, opposite to the positive piece, of the second separator; specifically, the negative piece is placed on a winding machine, the winding machine is started to wind the negative piece to form the negative piece roll, the negative piece roll is fitted on a third feeding roller of the laminating and piece-making device; the negative piece is pulled out to pass through an upper one of two third feeding rollers arranged perpendicular to the feeding direction, to pass through a third tensioning wheel, and to be wound to the other third feeding roller configured perpendicular to the feeding direction; the negative piece then sequentially passes through three third conveying rollers arranged at intervals along the feeding direction, and finally penetrates into the space betweens from the side, opposite to the positive piece, of the second separator.

S4.5, the laminating component is started, the first separator, the positive piece, the second separator and the negative piece are driven to move forwards together through rotation of, heating is carried out through, and pressure is applied to the first separator, the positive piece, the second separator and the negative piece to enable the hot-melt material on the first separator and the hot-melt material on the second separator to melt and hot-laminate the first separator, the positive piece, the second separator and the negative piece to form a composite flat sheet with an integrated structure; specifically, the first separator and the second separator may be aligned before hot-lamination, so that misalignment may be avoided, and of course, the first separator, the positive piece, the second separator and the negative piece may be aligned. Before the hot-lamination component, an ultrasonic welding device or a laser welding device may be started to weld a positive lug to the positive piece at the foil-free area of the positive piece and a negative lug to the negative piece at the foil-free area of the negative piece, the positive lug and the negative lug may be located on opposite sides, although it will be appreciated that in other embodiments, the lugs may also be on the same side. During the hot-lamination process, the temperature may be controlled to be 45~85° C. to facilitate melting of the hot-melt material, and the duration of the hot-lamination may be controlled by an operating speed, typically 2~30 m/min. The pressure applied by to the composite flat sheet during hot-lamination may be 1 T~2 T.

The preparation method of the button lithium ion battery includes the steps of winding the lithium ion cell composite flat sheet prepared by the above method to form a cell, placing the cell into a battery housing, and then performing liquid injection and sealing to obtain the button lithium ion battery. In some embodiments, the lithium ion cell composite flat sheet may be placed on a winding machine at a winding needle thereof, the winding machine is started, the winding needle rotates, and the composite flat sheet is wound to form a cell. The prepared cell is placed into a housing cup, an electrolyte is injected, the housing top and the housing cup are closed, and sealing is performed to obtain the button lithium ion battery.

The adoption of the composite flat sheet for winding to form the cell may get rid of two problems: 1, poor distance between the lugs due to the fact that the pieces are not inserted in place; and 2, winding misalignment, piece drifting and other problems caused by deviation of the piece. Moreover, the winding process may be simplified, the winding efficiency is greatly improved, and the labor cost is reduced.

It is to be understood that the above examples are merely illustrative of the preferred embodiments of the present invention, which are described in greater detail, but are not to be construed as limiting the scope of the present invention; it should be noted that those skilled in the art can randomly combine the above-mentioned technical features without departing from the inventive concept, and can also make several variations and modifications within the scope of the invention; therefore, it is intended that the present invention cover the modifications and variations of this invention provided they come within the scope of the appended claims.

What is claimed is:

1. A button lithium ion battery, comprising a battery housing, a cell accommodated in the battery housing, and an electrolyte filled in the battery housing; wherein the cell is formed by winding a composite flat sheet in which a first separator, a positive piece, a second separator and a negative piece are sequentially stacked and hot-laminated to form an integrated structure;
wherein the battery housing comprises a housing top and a housing cup matched with the housing top; the housing top comprises a first cover body and a first opening provided at one end of the first cover body; one end, distal to the first opening, of the first cover body is configured to correspond to a negative electrode of the button lithium ion battery; the housing cup comprises a second cover body fitted around the first cover body and a second opening provided at one end of the first cover body; one end, distal to the second opening, of the second cover body is configured to correspond to a positive electrode of the button lithium ion battery; the battery housing further comprises an explosion-proof structure which is formed by stretch molding on an outer end face of the end, distal to the first opening, of the first cover body, and/or on an outer end face of the end, distal to the second opening, of the second cover body.

2. The button lithium ion battery according to claim 1, wherein one side of the first separator is coated with a hot-melt material; the side of the first separator coated with the hot-melt material faces the positive piece; two sides of the second separator are coated with the hot-melt material connected with the positive piece and the negative piece.

3. The button lithium ion battery according to claim 2, wherein the hot-melt material comprises polyvinylidene fluoride hexafluoropropylene.

4. The button lithium ion battery according to claim 1, wherein, a width of the composite flat sheet is 2 mm~350 mm; the hot-lamination is conducted at a temperature of 45~5° C.; and/or a pressure imposed on the composite flat sheet when conducting the hot-lamination is 1 T~2 T.

5. The button lithium ion battery according to claim 1, wherein the positive piece comprises a positive substrate and a positive material coated on the positive substrate; and/or the negative piece comprises a negative substrate and a negative material coated on the negative piece.

6. The button lithium ion battery according to claim 1, wherein two ends of the cell are respectively provided with a positive lug and a negative lug; the positive lug is disposed on the positive piece; the negative lug is disposed on the negative piece.

7. The button lithium ion battery according to claim 1, wherein the explosion-proof structure is an explosion-proof stamp which is formed by stretch molding on the outer end face of the end, distal to the first opening, of the first cover body, and/or on the outer end face of the end, distal to the opening, of the second cover body.

8. The button lithium ion battery according to claim 1, wherein the explosion-proof stamp has a width of 0.1~0.2 mm; the explosion-proof stamp has a depth of 0.03~0.07 mm.

9. The button lithium ion battery according to claim 1, wherein the explosion-proof stamp comprises a negative indicator disposed on the outer end face of the end, distal to the first opening, of the first cover body, and/or a positive indicator disposed on the outer end face of the end, distal to the second opening, of the second cover body.

10. The button lithium ion battery according to claim 9, wherein the first cover body comprises a first body and a first boss provided at one end, distal to the first opening, of the first body; the negative indicator is disposed on an outer end face of the first boss; the second cover body comprises a second body and a second boss provided at one end, distal to the second opening, of the second body; the positive indicator is disposed on an outer end face of the second boss.

11. The button lithium ion battery according to claim 1, wherein the battery housing is a metal housing.

12. The button lithium ion battery according to claim 6, characterized by further comprises an insulating rod penetrating through the cell; the cell comprises a central through-hole through which the insulating rod penetrates; the positive lug and the negative lug respectively has a first state where the lug protrudes out of an end face of the cell and forms a set included angle with the end face of the cell, and a second state where the lug presses downwards towards the cell under an action of external force to abut against an end part of the insulating rod and is attached to an inner wall of the battery housing.

13. The button lithium ion battery according to claim 12, wherein the positive lug and the negative lug are respectively positioned on two opposite sides of the central through-hole; and the set included angle is greater than 0 degrees and is less than or equal to 90 degrees.

14. The button lithium ion battery according to claim 12, wherein a length of the insulating rod is greater than or equal to a depth of the central through-hole; an outer diameter of the insulating rod is smaller than or equal to an inner diameter of the central through-hole.

15. The button lithium ion battery according to claim 12, wherein lengths of the positive lug and the negative lug (30), respectively, are greater than a radius of the cell and smaller than or equal to a diameter of the cell.

16. The button lithium ion battery according to claim 12, wherein the battery housing comprises a housing top and a housing cup matched with the housing top; in the second state, the negative lug (30) is attached to an inner wall surface of the housing top, and the positive lug is attached to an inner wall surface of the housing cup.

17. The button lithium ion battery according to claim 12, wherein the insulating rod comprises a main body part and two end parts arranged at two ends of the main body part; the main body part is made of a metal material, and the end part is made of an insulating material; or the whole insulating rod is made of an insulating material.

* * * * *